US010396701B2

(12) United States Patent
Hara et al.

(10) Patent No.: US 10,396,701 B2
(45) Date of Patent: Aug. 27, 2019

(54) MOTOR CONTROL DEVICE, BLOWING DEVICE, AND CLEANER

(71) Applicant: Nidec Corporation, Kyoto (JP)

(72) Inventors: Yasoya Hara, Kyoto (JP); Hiroki Morioka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/049,853

(22) Filed: Jul. 31, 2018

(65) Prior Publication Data

US 2019/0052219 A1 Feb. 14, 2019

(30) Foreign Application Priority Data

Aug. 9, 2017 (JP) .................................. 2017-154301

(51) Int. Cl.
| | |
|---|---|
| *H02P 6/06* | (2006.01) |
| *H02P 29/60* | (2016.01) |
| *A47L 9/22* | (2006.01) |
| *H02P 29/032* | (2016.01) |
| *H02P 6/17* | (2016.01) |
| *A47L 5/22* | (2006.01) |

(Continued)

(52) U.S. Cl.
CPC ................ *H02P 29/60* (2016.02); *A47L 5/14* (2013.01); *A47L 5/22* (2013.01); *A47L 5/28* (2013.01); *A47L 9/22* (2013.01); *A47L 9/2831* (2013.01); *A47L 9/2842* (2013.01); *F04D 25/06* (2013.01); *F04D 25/08* (2013.01); *F04D 27/004* (2013.01); *H02P 6/06* (2013.01); *H02P 6/17* (2016.02); *H02P 29/032* (2016.02)

(58) Field of Classification Search
CPC ...... H02P 6/08; H02P 6/17; H02P 6/06; F04D 15/0066; F04D 27/004; F04D 25/08; A47L 9/2831; A47L 5/14

See application file for complete search history.

(56) References Cited

U.S. PATENT DOCUMENTS

| 6,023,144 A * | 2/2000 | Imai ........................ F01P 7/048 |
|---|---|---|
| | | 165/209 |
| 6,388,416 B1 * | 5/2002 | Nakatani ................. H02P 6/085 |
| | | 318/700 |

(Continued)

FOREIGN PATENT DOCUMENTS

| JP | 2003-111475 A | 4/2003 |
|---|---|---|
| JP | 2008-188264 A | 8/2008 |
| WO | 2016/059723 A1 | 4/2016 |

*Primary Examiner* — Thai T Dinh
(74) *Attorney, Agent, or Firm* — Keating & Bennett, LLP

(57) ABSTRACT

A motor control device of a motor includes voltage acquisition circuitry that acquires a drive voltage of the motor; rotational speed acquisition circuitry that acquires a rotational speed of the motor; setting circuitry that sets a rotational speed instruction value of the motor; calculation circuitry that calculates a rotational speed threshold value of the motor; change circuitry that changes the rotational speed instruction value; and storage circuitry that stores reference data. The reference data includes at least three types of reference value sets each including a reference drive voltage value, a reference rotational speed instruction value, and a reference rotational speed threshold value. The calculation circuitry performs a proportional calculation, a current rotational speed instruction value, and the reference value set to calculate the rotational speed threshold value.

15 Claims, 7 Drawing Sheets

(51) Int. Cl.

| | |
|---|---|
| *A47L 9/28* | (2006.01) |
| *F04D 25/06* | (2006.01) |
| *F04D 25/08* | (2006.01) |
| *F04D 27/00* | (2006.01) |
| *A47L 5/14* | (2006.01) |
| *A47L 5/28* | (2006.01) |

(56) References Cited

U.S. PATENT DOCUMENTS

| | | | |
|---|---|---|---|
| 6,958,586 B2 * | 10/2005 | Tanimoto | H02P 21/06 |
| | | | 318/400.02 |
| 7,443,127 B2 * | 10/2008 | Okazaki | B60L 15/025 |
| | | | 318/722 |
| 8,416,571 B2 * | 4/2013 | Mizumura | H05K 7/20836 |
| | | | 361/679.48 |
| 8,482,234 B2 | 7/2013 | Yamakawa et al. | |
| 2003/0061879 A1 | 4/2003 | Otsuka | |

* cited by examiner

MOTOR CONTROL DEVICE, BLOWING DEVICE, AND CLEANER

CROSS REFERENCE TO RELATED APPLICATIONS

This application claims the benefit of priority to Japanese Patent Application No. 2017-154301 filed on Aug. 9, 2017. The entire contents of this application are hereby incorporated herein by reference.

BACKGROUND OF THE INVENTION

1. Field of the Invention

This disclosure relates to a motor control device, a blowing device, and a cleaner.

2. Description of the Related Art

For example, a variable speed fan motor including an abnormal rotational speed detecting device is disclosed in Japanese Unexamined Patent Application Publication No. 2003-111475. The variable speed fan motor is configured so that a rotational speed threshold value for alarm generation can be changed in conjunction with a rotational speed command value to input into a comparison circuit.

For example, in a blowing device used for a cleaner or the like, in a case where cooling by an air flow cannot be sufficiently obtained, a temperature of a motor tends to increase. The increase in the temperature of the motor tends to become large even in a case where a drive voltage is high in addition to a case where the rotational speed command value is high. Considering such a trend, as disclosed in Japanese Unexamined Patent Application Publication No. 2003-111475, it is not sufficient to merely change the rotational speed threshold value in conjunction with the change in the rotational speed command value and it is desired to change the threshold value of the rotational speed based on the rotational speed command value and the drive voltage.

SUMMARY OF THE INVENTION

According to a preferred embodiment of the present invention, a motor control device of a brushless DC motor includes voltage acquisition circuitry that acquires a drive voltage of the motor; rotational speed acquisition circuitry that acquires a rotational speed of the motor; setting circuitry that sets a rotational speed instruction value of the motor according to an instruction input from an outside; calculation circuitry that calculates a rotational speed threshold value of the motor according to the rotational speed instruction value; change circuitry that changes the rotational speed instruction value in a case where the rotational speed acquired by the rotational speed acquisition circuitry exceeds the rotational speed threshold value; and storage circuitry that stores reference data to calculate the rotational speed threshold value. The reference data includes at least three types of reference value sets each including a reference drive voltage value, a reference rotational speed instruction value, and a reference rotational speed threshold value. The calculation circuitry performs a proportional calculation based on a current drive voltage value which is acquired by the voltage acquisition circuitry, a current rotational speed instruction value which is set by the setting circuitry, and the reference value set to calculate the rotational speed threshold value.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Figure 1:
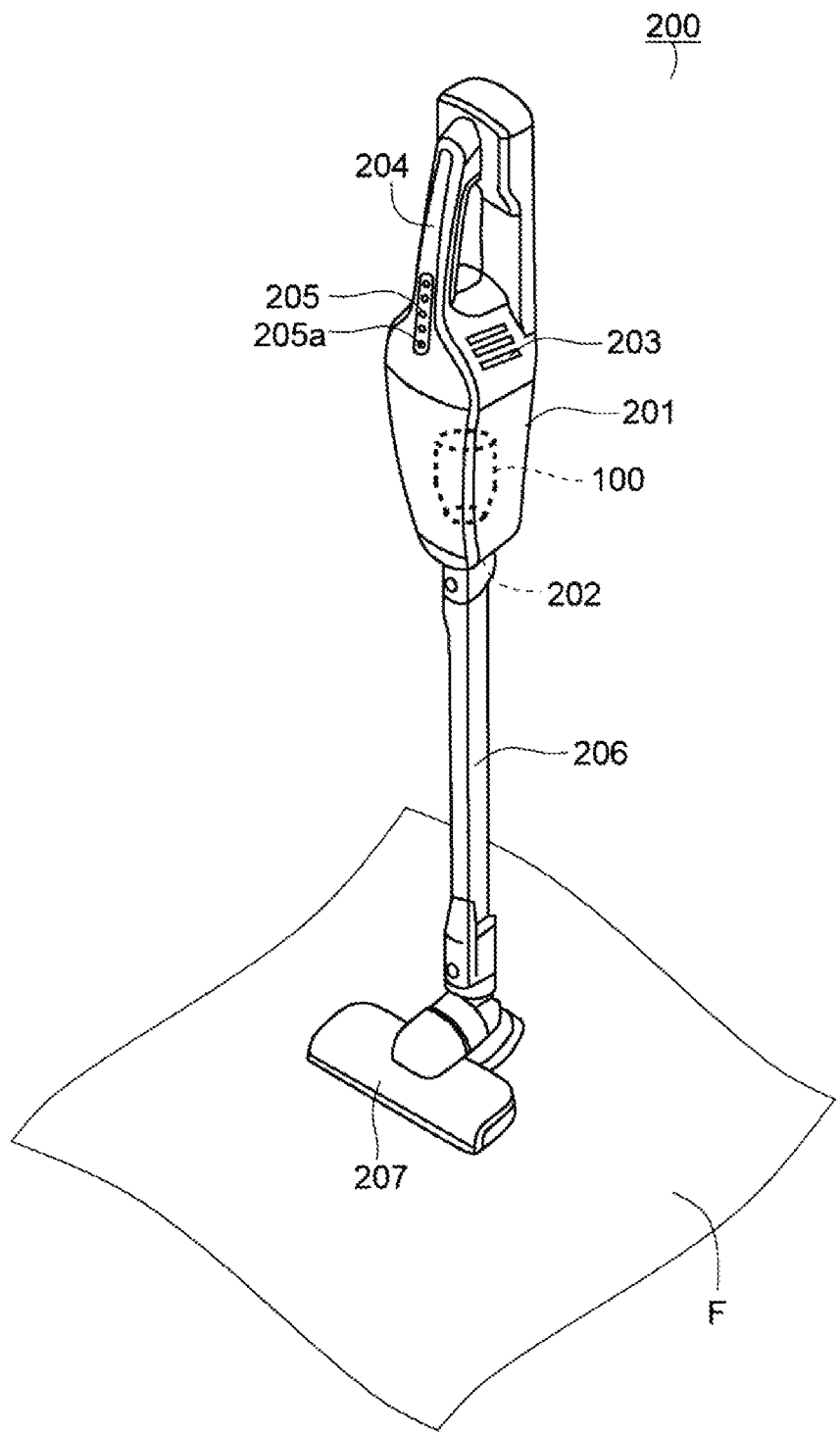
FIG. 1 is a perspective view of a cleaner according to a preferred embodiment of the present invention.

Hereinafter, preferred embodiments of the present invention will be described in detail with reference to the drawings. Moreover, in this specification, in the brushless DC motor 1 and a blowing device 100, a direction parallel to a central axis C of the brushless DC motor 1 is referred to as an "axial direction", a direction orthogonal to the central axis C of the brushless DC motor 1 is referred to as a "radial direction", and a direction along a circular arc about the central axis C of the brushless DC motor 1 is referred to as a "circumferential direction", respectively.

In addition, in this specification, in the blowing device 100, a shape and a positional relationship of each portion will be described with the axial direction as a vertical direction, and an impeller 2 side with respect to the brushless DC motor 1 as an upper side. The vertical direction is simply used for explanation and does not limit an actual positional relationship and direction.

In addition, in this specification, in a cleaner 200, the shape and the positional relationship of each portion will be described with a direction approaching a floor surface F (surface to be cleaned) of FIG. 1 as "downward" and a direction away from the floor surface F as "upward". These directions are merely used for explanation and do not limit the actual positional relationship and the directions.

In addition, the "upstream" and the "downstream" respectively indicate upstream and downstream in a flowing direction of the air drawn from an intake port 102 when the impeller 2 is rotated.

FIG. 1 is a perspective view of the cleaner 200 according to an embodiment of this disclosure. In the embodiment, the cleaner 200 has the blowing device 100. The cleaner 200 is a so-called stick type electric cleaner. Moreover, the cleaner 200 may be a so-called robot type, canister type, or handy type electric cleaner.

The cleaner 200 includes a casing 201 in which an intake portion 202 and an exhaust portion 203 are respectively provided on a lower surface and an upper surface. The cleaner 200 has a rechargeable battery (not illustrated) and is operated by electric power supplied from the battery. However, the cleaner 200 has a power supply cord (not illustrated) and may be operated by, for example, electric power supplied via a power supply cord connected to a power supply outlet (not illustrated) provided on a wall surface of a living room.

An air passage (not illustrated) for connecting the intake portion 202 and the exhaust portion 203 is formed in the casing 201. A dust collecting portion (not illustrated), a filter (not illustrated), and the blowing device 100 are disposed in order from the intake portion 202 (upstream) to the exhaust portion 203 (downstream) in the air passage. Trash such as dust contained in the air circulating through the air passage is caught by the filter and is collected in the dust collecting portion formed in a container shape. The dust collecting portion is configured to be attachable and detachable to and from the casing 201. Moreover, the blowing device 100 includes a self-cooling function of cooling the brushless DC motor 1 (see FIG. 3) with a flow of the air generated by itself.

A grip portion 204 and an operation portion 205 are provided on an upper portion of the casing 201. A user can grasp the grip portion 204 and move the cleaner 200. The operation portion 205 has a plurality of buttons 205a. A user performs operation setting of the cleaner 200 by operations of the buttons 205a. For example, a driving start, a driving stop, a change in a rotational speed, and the like of the blowing device 100 are instructed by operations of the buttons 205a.

In the embodiment, a button for setting a target rotational speed of the blowing device 100 is included in the plurality of the buttons 205a. The target rotational speed may be set by inputting a numerical value. In addition, as another example, a plurality of settable target rotational speeds are prepared in advance and the target rotational speed may be set by selecting one of them by a user. For example, one of "strong", "medium", and "weak" classified by the buttons 205a according to a magnitude of the target rotational speed can be selected and setting of the target rotational speed may be performed by selecting one of "strong", "medium", and "weak" by the user.

A rod-shaped suction pipe 206 is connected to the intake portion 202. A suction nozzle 207 is detachably attached to the suction pipe 206 at an upstream end of the suction pipe 206. Dust on the floor surface F can be drawn in by moving the suction nozzle 207 on the floor surface F. Moreover, the upstream end of the suction pipe 206 is a lower end of the suction pipe 206 in FIG. 1.

In the cleaner 200, for example, if an inflow amount of air into the blowing device 100 is decreased by blocking the air passage, the rotational speed of the brushless DC motor 1 (see FIG. 3) included in the blowing device 100 increases. In a state where the inflow amount of the air is decreased, since the cooling function due to the flow of the air cannot be obtained, the brushless DC motor 1 continues to rotate as it is, causing an increase in temperature. However, since the cleaner 200 of the embodiment has a motor control device 3 which is described later, it is possible to sense that the inflow amount of the air is decreased due to blocking or the like, by the rotational speed of the brushless DC motor 1. In a case where the inflow amount of the air is decreased and the rotational speed of the brushless DC motor 1 increases, an input of electric power into the motor is suppressed, so that it is possible to suppress that the temperature of the brushless DC motor 1 abnormally increases.

Figure 2:
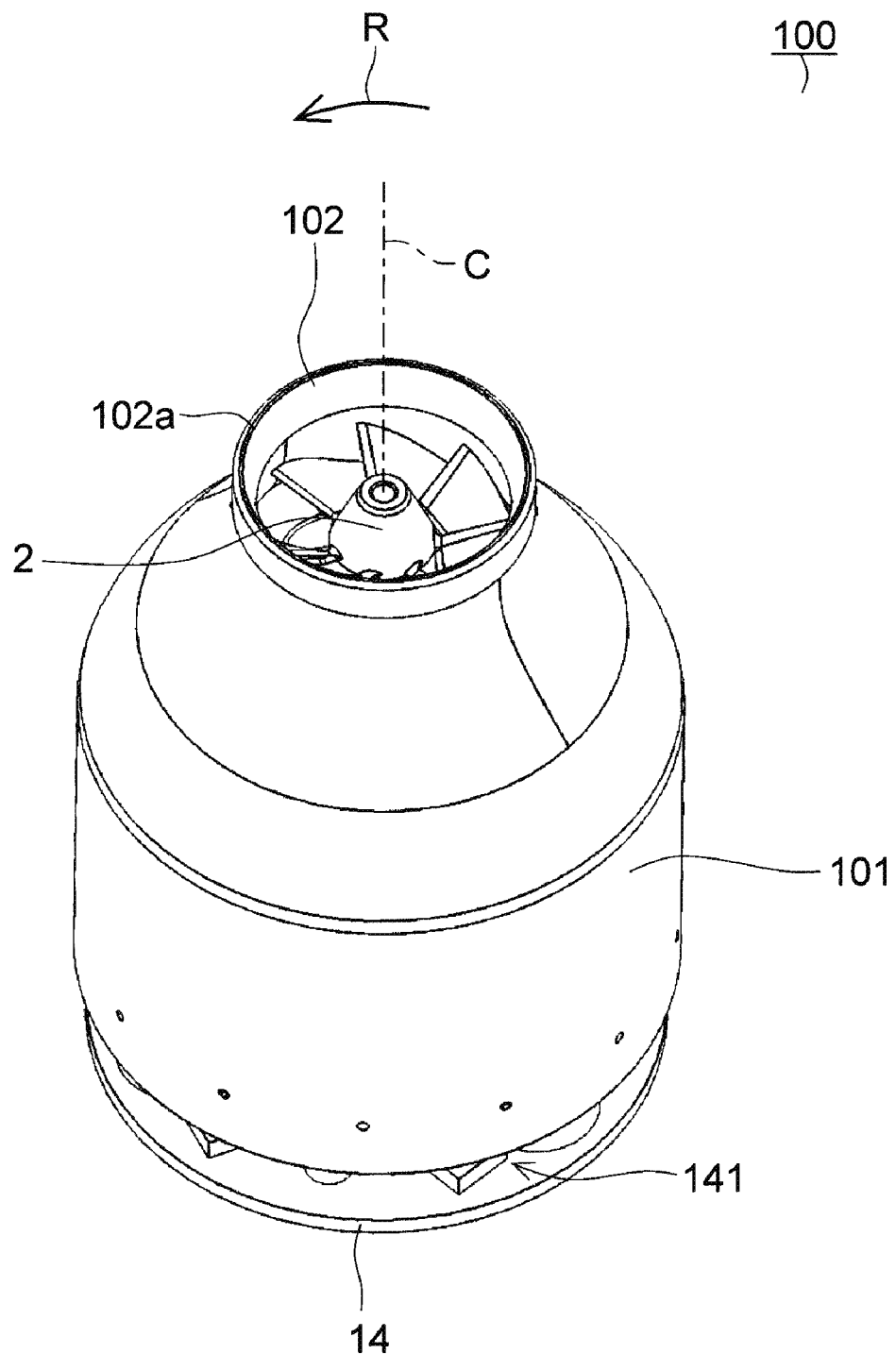
FIG. 2 is a perspective view of a blowing device according to a preferred embodiment of the present invention.
Figure 3:
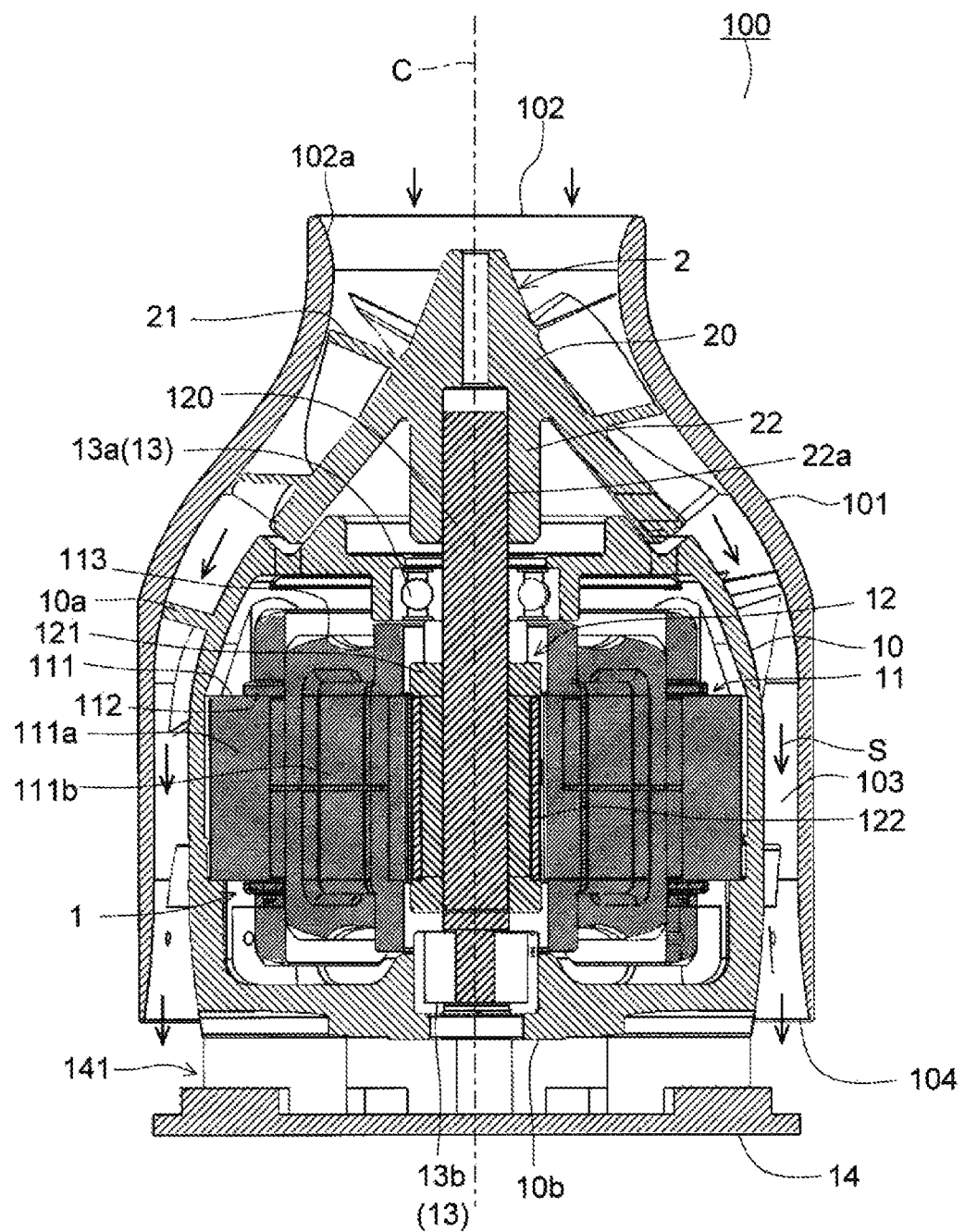
FIG. 3 is a vertical sectional view of the blowing device according to a preferred embodiment of the present invention.

FIG. 2 is a perspective view of the blowing device 100 according to an embodiment of this disclosure. FIG. 3 is a vertical sectional view of the blowing device 100 according to the embodiment of this disclosure. The blowing device 100 is mounted on the cleaner 200 to suck the air. The blowing device 100 includes the brushless DC motor 1 and the impeller 2.

The blowing device 100 includes a cylindrical fan casing 101 having a circular cross section in a horizontal direction. The fan casing 101 accommodates the brushless DC motor 1 and the impeller 2 therein. The intake port 102 opening in a vertical direction is provided at an upper portion of the fan casing 101. An intake port 102 is provided with a bell mouth 102a extending obliquely inward in the radial direction from the upper end and extending downward. Therefore, a diameter of the intake port 102 smoothly decreases from the upper side to the lower side. A lower surface of the fan casing 101 opens in the vertical direction.

The brushless DC motor 1 has a cylindrical motor housing 10 having a circular cross section in the horizontal direction. A flow path 103 is formed in an interval between the fan casing 101 and the motor housing 10. The flow path 103 communicates with the impeller 2 at the upper end (upstream end) and an exhaust port 104 is formed at a lower end (downstream end) of the flow path 103. A disk-shaped lower lid 10b is disposed below a stator 11 which is described later. A lower surface of the motor housing 10 is covered by the lower lid 10b. The lower lid 10b is attached to the motor housing 10 by screws (not illustrated).

A plurality of stationary blades 10a are juxtaposed in the circumferential direction on an outer peripheral surface of the motor housing 10. The stationary blade 10a is formed in a plate shape. The stationary blade 10a is inclined in a direction opposite to a rotation direction R (see FIG. 2) of the impeller 2 as going upward. An upper side of the stationary blade 10a is convexly curved. Outer edges of the plurality of the stationary blades 10a are in contact with an inner surface of the fan casing 101. The stationary blades 10a guide an airflow downward as indicated by an arrow S by driving the blowing device 100.

The brushless DC motor 1 is an inner rotor type motor. However, the brushless DC motor 1 may be an outer rotor type motor. The brushless DC motor 1 includes the stator 11, a rotor 12, a bearing portion 13, and a circuit board 14.

The stator 11 is disposed on an outside of the rotor 12 in the radial direction. The stator 11 includes a stator core 111, an insulator 112, and a coil 113. The stator core 111 is made of a laminated steel plate in which electromagnetic steel plates are laminated in the axial direction. The stator core 111 has an annular core back 111a and a plurality of teeth 111b. The plurality of the teeth 111b extend inward in the radial direction from an inner peripheral surface of the core back 111a and are disposed in the radial direction. The plurality of the teeth 111b are disposed in the circumferential direction with equal intervals.

The insulator 112 is made of an insulating material such as resin and covers at least a part of the stator core 111. The coil 113 is formed by winding a conductive wire around the teeth 111b via the insulator 112. That is, the insulator 112 is disposed between the coil 113 and the teeth 111b. The teeth 111b and the coil 113 are insulated by the insulator 112. The stator 11 includes the coil 113 of a plurality of phases. In the embodiment, the stator 11 includes the coil 113 of U phase, V phase, and W phase.

The rotor 12 has a shaft 120 and a rotor housing 121. The shaft 120 is disposed along the central axis C. The shaft 120 is circular in plan view from the axial direction. The shaft 120 may be columnar or tubular. The rotor housing 121 has a cylindrical shape. The rotor housing 121 holds the shaft 120. The rotor housing 121 is made of a magnetic material.

A magnet 122 is disposed on an outer peripheral surface of the rotor housing 121. The magnet 122 may be configured of a plurality of magnet pieces. In this case, an outer surface of each magnet piece in the radial direction faces an inner end surface of each tooth 111b in the radial direction. In the plurality of the magnet pieces, a magnetic pole surface of an N pole and a magnetic pole surface of an S pole are alternately arranged with equal intervals in the circumferential direction. As another example, the magnet 122 may be an annular magnet. In this case, the N pole and the S pole are alternately magnetized on the outer peripheral surface of the magnet in the circumferential direction.

The bearing portion 13 rotatably supports the shaft 120 held by the rotor housing 121. The shaft 120 rotates together with the rotor housing 121 about the central axis C. The rotation direction is the R direction illustrated in FIG. 2. An upper bearing portion 13a is supported at a center portion of the motor housing 10. A lower bearing portion 13b is supported at a center portion of the lower lid 10b. In the embodiment, the upper bearing portion 13a has ball bearings and the lower bearing portion 13b has sliding bearings. Moreover, the upper and lower bearing portions 13a and 13b may have other types of bearings. For example, the upper and lower bearing portions 13a and 13b may have ball bearings.

The circuit board 14 is disposed below the lower lid 10b. The circuit board 14 has a circular shape and is made of, for example, resin such as epoxy resin. An electronic component 141 is disposed on the circuit board 14. The electronic component 141 includes the motor control device 3 according to the exemplary embodiment of this disclosure. In other words, the blowing device 100 has the motor control device 3. The circuit board 14 is electrically connected to the stator 11 by connection terminals (not illustrated). Electric power is supplied from a battery (not illustrated) to the coil 113 via the circuit board 14, so that the brushless DC motor 1 is driven. Moreover, in a case where the power supply is not a rechargeable battery but a commercial power supply, an AC/DC converter that converts Alternating Current (AC) electric power supplied from the commercial power supply into DC electric power may be disposed in the circuit board 14.

The impeller 2 is a so-called mixed flow impeller. However, the impeller 2 may be an impeller of another shape such as an axial flow type or a centrifugal type. The impeller 2 has a base portion 20 and a plurality of blades 21. A diameter of the base portion 20 increases as going downward. That is, the base portion 20 gradually expands downward. An upper end portion (tip portion) of the base portion 20 is disposed at substantially the same height as a lower end of the bell mouth 102a. The plurality of the blades 21 are juxtaposed on an outer peripheral surface of the base portion 20 in the circumferential direction. An upper portion of the blade 21 is disposed forward of a lower portion of the blade 21 in the rotation direction R.

The impeller 2 is attached to the brushless DC motor 1. In the embodiment, the impeller 2 is attached to the shaft 120. Specifically, the impeller 2 has a boss portion 22 provided on a lower portion side of the center portion of the base portion 20, through which the central axis C passes. The upper end portion of the shaft 120 is press-fitted into a hole portion 22a of the boss portion 22 extending in the axial direction. A center of the hole portion 22a coincides with the central axis C. Moreover, the impeller 2 may be attached to, for example, a member other than the shaft 120 configuring the rotor 12, such as the rotor housing 121.

When the brushless DC motor 1 is driven, the impeller 2 rotates about the central axis C together with the shaft 120. Therefore, the blowing device 100 generates the flow of the air. In the blowing device 100, when the flow of the air decreases, the rotational speed of the brushless DC motor 1 increases. In a state where the inflow amount of the air decreases, the cooling function due to the flow of the air cannot be obtained, so that the brushless DC motor 1 continues the rotation as it is, causing an increase in temperature. However, since the blowing device 100 of the embodiment has the motor control device 3 which is described later, it is possible to sense that the cooling efficiency of the motor is decreased due to an decrease in the flow of the air, by the rotational speed of the brushless DC motor 1. In a case where the rotational speed increases, it is possible to suppress that the temperature of the brushless DC motor 1 abnormally increases by suppressing an input of electric power to the motor.

Figure 4:
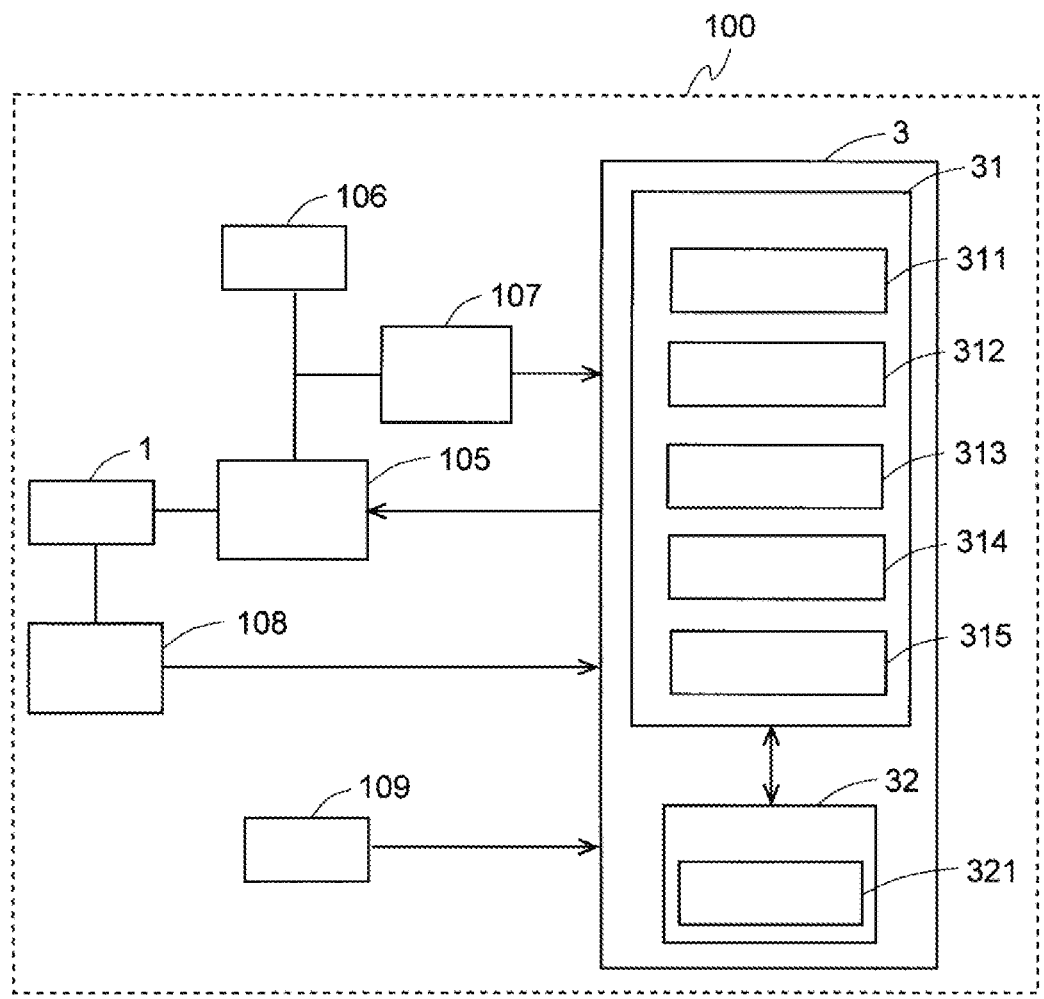
FIG. 4 is a block diagram for explaining a configuration of a motor control device according to a preferred embodiment of the present invention.

Next, details of the motor control device 3 will be described. The motor control device 3 is a motor control device for the brushless DC motor 1. FIG. 4 is a block diagram for explaining a configuration of the motor control device 3 according to an embodiment of this disclosure. In addition to the motor control device 3, configuration elements included in the blowing device 100 related to the motor control device 3 are also described in FIG. 4.

In the embodiment, the motor control device 3 is a microcomputer. The motor control device 3 has a Central Processing Unit (CPU) 31 and a storage portion 32. In detail, the storage portion 32 includes a Random Access Memory (RAM) and a Read Only Memory (ROM). The RAM temporarily stores information used for a calculation process. The ROM stores a computer program and data. The motor control device 3 realizes various functions necessary for controlling the brushless DC motor 1 by executing the computer program stored in the storage portion 32.

The motor control device 3 controls the rotation of the brushless DC motor 1 by Pulse Width Modulation (PWM) control of an inverter circuit 105. The inverter circuit 105 is a well-known circuit including a plurality of switching elements. A power supply portion 106 supplies electric power to the brushless DC motor 1 via the inverter circuit 105. In the embodiment, the power supply portion 106 has a rechargeable battery and is a DC power supply. Moreover, the power supply portion 106 may be an AC power supply. In this case, the power supply portion 106 may convert the AC electric power into the DC electric power by the AC/DC converter to supply electric power to the inverter circuit 105.

The motor control device 3 includes a voltage acquisition portion 311, a rotational speed acquisition portion 312, a setting portion 313, a calculation portion 314, and a change portion 315. A function of each of the portions 311 to 315 is realized by executing a calculation process by the CPU 31 in accordance with a computer problem stored in the storage portion 32.

Moreover, in the embodiment, the function of each of the portions 311 to 315 is realized by software by the calculation process of the CPU 31 in accordance with the computer program, but at least a part of the functions may be realized by electrical hardware provided by circuitry, for example. In addition, each of the portions 311 to 315 is a conceptual configuration component. A function executed by one configuration component may be distributed to a plurality of configuration components or functions included in a plurality of configuration components may be integrated into one configuration component.

The voltage acquisition portion 311 acquires a drive voltage of the brushless DC motor 1. The blowing device 100 has a voltage detection portion 107 that measures the drive voltage supplied from the power supply portion 106 to the brushless DC motor 1. The voltage acquisition portion 311 acquires a drive voltage value measured by the voltage detection portion 107. In the embodiment, a rechargeable battery is used as the power supply portion 106. The drive voltage of the brushless DC motor 1 varies depending on a charging state of the battery. In the embodiment, a rated voltage of the brushless DC motor 1 is 25.2 V. An upper limit value of the drive voltage value of the brushless DC motor 1 is 29.2 V and a lower limit value thereof is 21 V.

The rotational speed acquisition portion 312 acquires the rotational speed of the brushless DC motor 1. The brushless DC motor 1 has a rotational position detection portion 108 that detects a rotational position of the rotor 12. The rotational position detection portion 108 may be, for example, a Hall element. However, the rotational position detection portion 108 may be configured to detect the rotational position of the rotor 12 based on an induced voltage generated in the coil 113 due to the rotation of the rotor 12. The rotational speed acquisition portion 312 acquires the rotational position of the rotor 12 from the rotational position detection portion 108 and acquires the rotational speed of the brushless DC motor 1 based on rotational position information.

The setting portion 313 sets a rotational speed instruction value of the brushless DC motor 1 according to an instruction input from an outside. The rotational speed instruction value is an instruction value for setting the brushless DC motor 1 to a rotational speed according to a request of the user. In the embodiment, the rotational speed instruction value is a duty ratio (%) of a voltage applied to the coil 113. In the embodiment, an input portion 109 included in the blowing device 100 is included in the operation portion 205 provided in the cleaner 200. The setting portion 313 receives information related to a target rotational speed input by the input portion 109 by the user. The setting portion 313 sets the rotational speed instruction value according to received information. Moreover, in the embodiment, the motor control device 3 rotates the brushless DC motor 1 with open loop control according to the rotational speed instruction value that is set. That is, the motor control device 3 does not perform feedback control for setting the rotational speed of the brushless DC motor 1 to the target rotational speed.

The calculation portion 314 calculates a rotational speed threshold value of the brushless DC motor 1 according to the rotational speed instruction value. In the embodiment, the rotational speed threshold value is set so as to be capable of sensing occurrence of blockage, causing the flow of the air in the cleaner 200 to decrease. As described above, the blockage occurs, the rotational speed of the brushless DC motor 1 increases. The rotational speed threshold value is determined so that the increase in the rotational speed due to blockage can be detected.

Specifically, the storage portion 32 stores reference data 321 for calculating the rotational speed threshold value. The reference data 321 includes at least three types of reference value sets of which each is configured of a reference drive voltage value, a reference rotational speed instruction value, and a reference rotational speed threshold value. The calculation portion 314 performs a proportional calculation based on a current drive voltage value which is acquired by the voltage acquisition portion 311, a current rotational speed instruction value which is set by the setting portion 313, and the reference value set to calculate the rotational speed threshold value. According to the embodiment, since it is possible to calculate the rotational speed threshold value suitable for the current drive voltage value and the rotational speed instruction value by a simple calculation formula, it is possible to reduce a calculation load in the motor control device 3. A more specific calculation method of the rotational speed threshold value will be described later.

Moreover, it is preferable that the number of the reference value sets is five or more. Therefore, a set of the reference value sets used for the proportional calculation can be appropriately selected according to the current drive voltage value and the rotational speed instruction value and an appropriate rotational speed threshold value can be calculated. In the embodiment, as described later, the number of the reference value sets is five.

The change portion 315 performs predetermined confirmation on the rotational speed acquired by the rotational speed acquisition portion 312. The change portion 315 changes the rotational speed instruction value in a case where the rotational speed acquired by the rotational speed acquisition portion 312 exceeds the rotational speed threshold value. Specifically, the change portion 315 decreases the rotational speed instruction value in a case where the rotational speed acquired by the rotational speed acquisition portion 312 exceeds the rotational speed threshold value. Therefore, in a case where the rotational speed of the brushless DC motor 1 exceeds the rotational speed threshold value, electric power input into the motor 1 is suppressed. As a result, it is possible to prevent the brushless DC motor 1, of which the flow of the air is decreased and the cooling function is decreased, from continuing to rotate at a high rotational speed, so that it is possible to appropriately suppress that the temperature of the motor 1 increases.

Moreover, in the embodiment, the change portion 315 performs a process of stopping the driving of the brushless DC motor 1 in a case where the rotational speed acquired by the rotational speed acquisition portion 312 exceeds the rotational speed threshold value. That is, the change portion 315 sets the rotational speed instruction value to 0%. Therefore, since the rotation of the brushless DC motor 1, of which the flow of the air is decreased and the cooling function is decreased, is stopped, it is possible to suppress an increase in the temperature of the motor 1.

However, the change portion 315 may set the rotational speed instruction value to a second predetermined value or less and rotate the brushless DC motor 1 in a case where the rotational speed acquired by the rotational speed acquisition portion 312 exceeds the rotational speed threshold value. The second predetermined value may be, for example, 50%. Even if the brushless DC motor 1 of which the cooling function is decreased continues the rotation, the second predetermined value may be set to a range in which the increase in the temperature of the motor does not cause a problem. According to the configuration, even in a case where the rotational speed of the brushless DC motor 1 exceeds the rotational speed threshold value, it is possible to continue to drive the motor 1 by decreasing the rotational speed to a speed at which the increase in the temperature of the motor hardly occurs.

Figure 5:
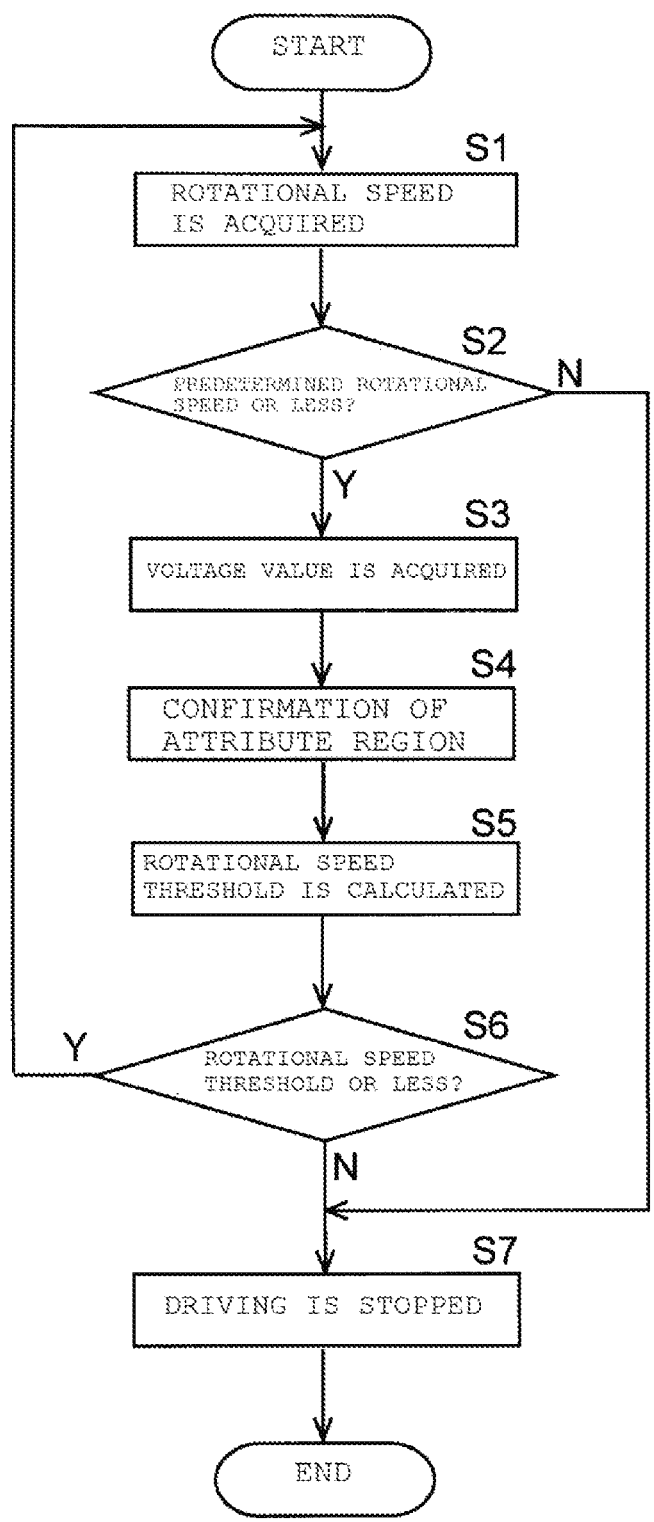
FIG. 5 is a flowchart illustrating a control flow executed by the motor control device according to a preferred embodiment of the present invention.

FIG. 5 is a flowchart illustrating a control flow executed by the motor control device 3 according to the embodiment of this disclosure. Specifically, FIG. 5 illustrates a control flow relating to the calculation of the rotational speed threshold value executed by the motor control device 3 and the rotation control of the brushless DC motor 1 based on the rotational speed threshold value. The motor control device 3 executes the flowchart illustrated in FIG. 5 when the driving of the brushless DC motor 1 is started.

First, the rotational speed of the brushless DC motor 1 is acquired by the rotational speed acquisition portion 312 (step S1). The acquired rotational speed is temporarily stored in the storage portion 32.

In the embodiment, it is confirmed whether or not the rotational speed acquired by the rotational speed acquisition portion 312 is a predetermined rotational speed or less (step S2) by the change portion 315. The predetermined rotational speed is set for the purpose of preventing occurrence of a problem that the rotational speed of the brushless DC motor 1 becomes an unexpected rotational speed. For example, the predetermined rotational speed is set to 90,000 rpm. In a case where the rotational speed acquired by the rotational speed acquisition portion 312 exceeds the predetermined rotational speed (No in step S2), the change portion 315 executes step S7 which is described later.

On the other hand, in a case where the rotational speed acquired by the rotational speed acquisition portion 312 is the predetermined speed or less (Yes in step S2), the drive voltage value of the brushless DC motor 1 is acquired by the voltage acquisition portion 311 (step S3). The acquired drive voltage value is temporarily stored in the storage portion 32.

Moreover, the acquisition of the rotational speed in step S1 and the acquisition of the drive voltage value in step S3 may be executed at the same timing. In addition, in some cases, the acquisition of the drive voltage value may be performed before the acquisition of the rotational speed.

Figure 6:
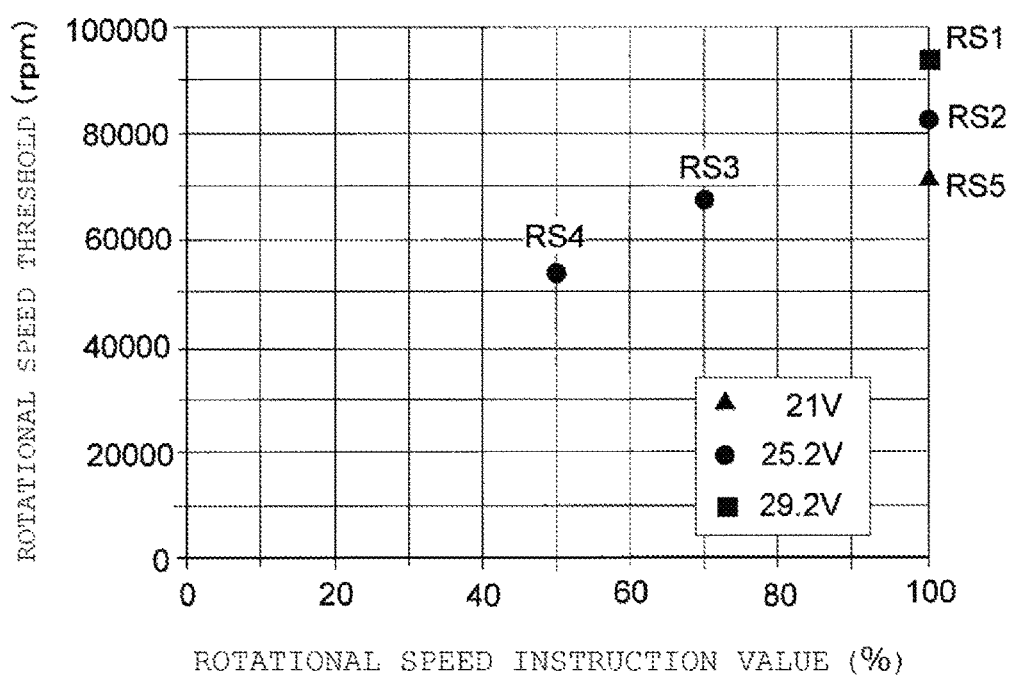
FIG. 6 is a graph for explaining a plurality of types of reference value sets stored in a storage portion.
Figure 7:
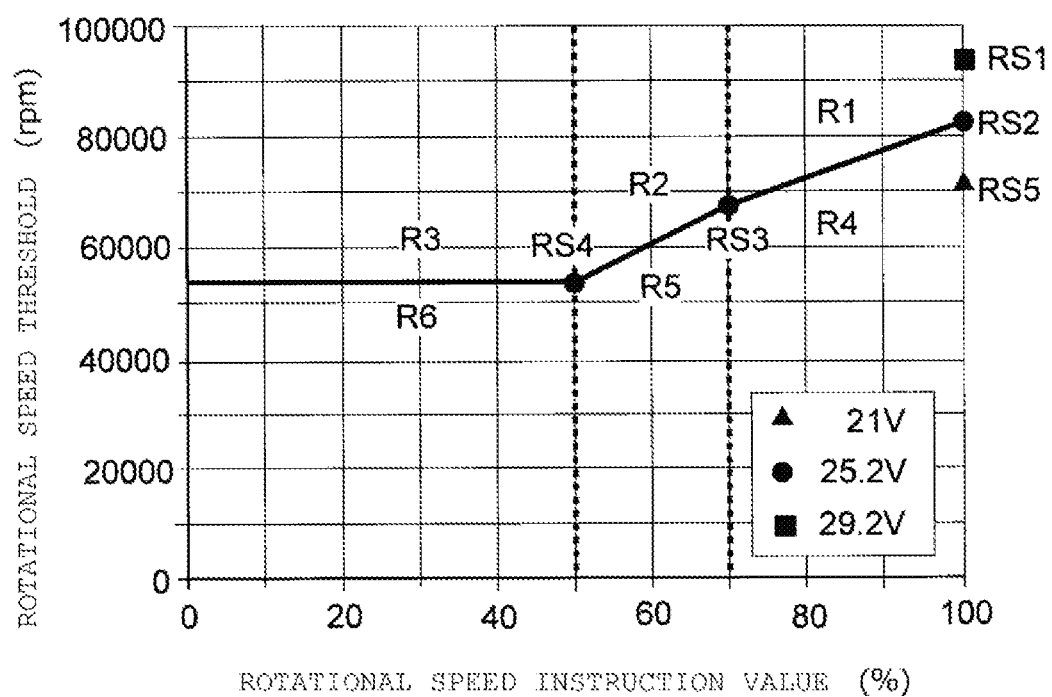
FIG. 7 is a graph for explaining a plurality of regions divided based on the reference value set.

Next, the calculation portion 314 determines a combination of the current drive voltage value and the rotational speed instruction value belongs to which one of a plurality of regions previously divided based on a plurality of types of the reference value sets (step S4). This will be described in detail with reference to FIGS. 6 and 7. FIG. 6 is a graph for explaining the plurality of types of the reference value sets stored in the storage portion 32. FIG. 7 is a graph for explaining a plurality of regions divided based on the reference value set. Moreover, a horizontal axis of respective graphs of FIGS. 6 and 7 represents the rotational speed instruction value (%) and a horizontal axis thereof represents the rotational speed threshold value (rpm). In addition, points indicated by the same figure in the graphs of FIGS. 6 and 7 indicate that the voltage values are the same.

First, the plurality of types of the reference value sets will be described with reference to FIG. 6.

In the embodiment, as illustrated in FIG. 6, the number of the reference value sets is five. Specifically, the five reference value sets are configured of a first reference value set RS1 (29.2 V, 100%, and 94,000 rpm), a second reference value set RS2 (25.2 V, 100%, and 83,000 rpm), a third reference value set RS3 (25.2 V, 70%, and 68,000 rpm), a fourth reference value set RS4 (25.2 V, 50%, and 54,000 rpm), and a fifth reference value set RS5 (21.0 V, 100%, and 71,000 rpm). In each reference value set, the numbers in parentheses are the reference drive voltage value, the reference rotational speed instruction value, and the reference rotational speed threshold value, in order.

In the embodiment, the five reference value sets include three reference value sets in which the reference drive voltage values are the same and the reference rotational speed instruction values are different from each other. The second reference value set RS2, the third reference value set RS3, and the fourth reference value set RS4, in which all the reference drive voltage values are 25.2 V, correspond to the three reference value sets. In addition, the five reference value sets include three reference value sets in which the reference rotational speed instruction values are the same and the reference drive voltage values are different from each other. The first reference value set RS1, the second reference value set RS2, and the fifth reference value set RS5, in which all the rotational speed instruction values are 100%, correspond to the three reference value sets.

Therefore, the three reference value sets, in which the reference drive voltage values are constant and the reference rotational speed instruction values are changed, and the three reference value sets, in which the reference rotational speed instruction values are constant and the reference drive voltage values are changed, are realized by the five reference value sets instead of six thereof. Therefore, the number of the reference value sets does not become too large and the calculation of the rotational speed threshold value can be easily calculated.

In the embodiment, in the three reference value sets, in which the reference drive voltage values are the same and the reference rotational speed instruction values are different from each other, the reference drive voltage value is a rated voltage of the brushless DC motor 1. Specifically, the reference drive voltage values of the second reference value set RS2, the third reference value set RS3, and the fourth reference value set RS4, in which the reference drive voltage values are the same, are 25.2 V which is the same as the rated voltage. Therefore, since the rated voltage which is most frequently used is included in the plurality of the reference value sets, it is possible to set a more appropriate rotational speed threshold value.

In the embodiment, in the three reference value sets, in which the reference rotational speed instruction values are the same and the reference drive voltage values are different from each other, the reference rotational speed instruction value is a maximum value capable of being set for an instructed value. Specifically, the reference rotational speed instruction values of the first reference value set RS1, the second reference value set RS2, and the fifth reference value set RS5, in which the reference rotational speed instruction values are the same, are 100% that is the same as the maximum value capable of being set for the rotational speed instruction value. Therefore, since the plurality of the reference value sets include the rotational speed instruction value at which the increase in the temperature of the brushless DC motor 1 is most problematic, it is possible to set a more appropriate rotational speed threshold value.

In a case where the three reference value sets, in which the reference rotational speed instruction values are the same and the reference drive voltage values are different from each other, are included in the plurality of the reference value sets, with reference to the reference value set having an intermediate reference drive voltage value, it is preferable that in a case where the reference drive voltage value varies in a direction to be large, a variation ratio of the reference rotational speed threshold value is smaller than that of a case where the reference drive voltage value varies in a direction to be small.

In the embodiment, as described above, the first reference value set RS1, the second reference value set RS2, and the fifth reference value set RS5 correspond to the three reference value sets in which the reference rotational speed instruction values are the same and the reference drive voltage values are different from each other. The reference drive voltage values are respectively 29.2 V, 25.2 V, and 21.0

V in order of the first reference value set RS1, the second reference value set RS2, and the fifth reference value set RS5. That is, the second reference value set RS2 among the three reference value sets RS1, RS2, and RS5 has the intermediate reference drive voltage value. With reference to the second reference value set RS2, the variation ratio of the reference rotational speed threshold value is 2,750 rpm/V (=|94,000−83,000|/|29.2−25.2|) in the first reference value set RS1, and is 2,857 rpm/V (=|71,000−83,000|/|21.0−25.2|) in the fifth reference value set RS5. That is, with reference to the second reference value set RS2, in a case where the reference drive voltage value goes toward the first reference value set RS1 to be large, the variation ratio of the reference rotational speed threshold value is smaller than that of a case where the reference drive voltage value goes toward the fifth reference value set RS5 to be small.

Therefore, the variation ratio of the rotational speed threshold value associated with a voltage variation is smaller at a time of a high voltage in which the increase in the temperature of the brushless DC motor 1 is most problematic than that at a time of a low voltage. Therefore, the threshold value for sensing abnormality in the rotational speed is set to a lower value at the time of the high voltage than that at the time of the low voltage, and it is possible to sensitively sense the abnormality of the rotational speed. Therefore, it is possible to suppress the input of electric power to the brushless DC motor 1 at an appropriate timing and it is possible to appropriately prevent the increase in the temperature of the motor 1.

In a case where three reference value sets, in which the reference drive voltage values are the same and the reference rotational speed instruction values are different from each other, are included in the plurality of the reference value sets, with reference to the reference value set having an intermediate reference rotational speed instruction value, it is preferable that in a case where the reference rotational speed instruction value varies in a direction to be large, a variation ratio of the reference rotational speed threshold value is smaller than that of a case where the reference rotational speed instruction value varies in a direction to be small.

In the embodiment, as described above, the second reference value set RS2, the third reference value set RS3, and the fourth reference value set RS4 correspond to the three reference value sets in which the reference drive voltage values are the same and the reference rotational speed instruction values are different from each other. The reference rotational speed instruction values are respectively 100%, 75%, and 50% in order of the second reference value set RS2, the third reference value set RS3, and the fourth reference value set RS4. That is, the third reference value set RS3 among the three reference value sets RS2, RS3, and RS4 has the intermediate reference rotational speed instruction value. With reference to the third reference value set RS3, the variation ratio of the reference rotational speed threshold value is 500 rpm/% (=|83,000−68,000|/|100−70|) in the second reference value set RS2, and is 700 rpm/% (=|54,000−68,000|/|50−70|) in the fourth reference value set RS4. That is, with reference to the third reference value set RS3, in a case where the rotational speed instruction value goes toward the second reference value set RS2 to be large, the variation ratio of the reference rotational speed threshold value is smaller than that of a case where the reference rotational speed instruction value goes toward the fourth reference value set RS4 to be small.

Therefore, the variation ratio of the rotational speed threshold value associated with a voltage variation is smaller at a time of a high voltage in which the increase in the temperature of the brushless DC motor 1 is most problematic than that at a time of a low voltage. Therefore, the threshold value for sensing abnormality in the rotational speed is set to a lower value in a case where the rotational speed instruction value is high than that of a case where the rotational speed instruction value is low, and it is possible to sensitively sense the abnormality of the rotational speed. Therefore, it is possible to suppress the input of electric power to the brushless DC motor 1 at an appropriate timing and it is possible to appropriately prevent the increase in the temperature of the motor 1.

A plurality of regions divided based on the reference value set will be described with reference to FIG. 7.

In the embodiment, as illustrated in FIG. 7, six regions R1 to R6 divided based on five reference value sets RS1 to RS5 exist. In FIG. 7, a set of the second reference value set RS2 and the third reference value set RS3, and a set of the third reference value set RS3 and the fourth reference value set RS4 among corresponding points of three reference value sets RS2, RS3, and RS4, in which the reference drive voltage values are the same (25.2 V), are indicated by a bold line connected by respective straight lines.

In the embodiment, the calculation portion 314 sets the rotational speed threshold value to be the same as the rotational speed instruction value which is the first predetermined value or less in a case where the drive voltage values are the same. The first predetermined value is 50% in the example illustrated in FIG. 7. In consideration of this, the bold line described above connects points from the corresponding point of the fourth reference value set RS4, in which the reference rotational speed instruction value is 50%, to a point at which the rotational speed threshold value is the same as the corresponding point, and extends in a direction in which the rotational speed instruction value becomes less than 50%.

Respective regions R1 to R6 are divided based on the bold line indicating a relationship between the rotational speed instruction value and the rotational speed threshold value at which the drive voltage value described above is 25.2 V. The first region R1 is a region which is used in a case where the drive voltage value is 25.2 V or more and the rotational speed instruction value is 70% or more. The second region R2 is a region which is used in a case where the drive voltage value is 25.2 V or more and the rotational speed instruction value is 50% or more and less than 70%. The third region R3 is a region which is used in a case where the drive voltage value is 25.2 V or more and the rotational speed instruction value is less than 50%. The fourth region R4 is a region which is used in a case where the drive voltage value is less than 25.2 V and the rotational speed instruction value is 70% or more. The fifth region R5 is a region which is used in a case where the drive voltage value is less than 25.2 V and the rotational speed instruction value is 50% or more and less than 70%. The sixth region R6 is a region which is used in a case where the drive voltage value is less than 25.2 V and the rotational speed instruction value is length 50%.

For example, in a case where the drive voltage value acquired by the voltage acquisition portion 311 is 27.2 V and the rotational speed instruction value set by the setting portion 313 is 80%, the calculation portion 314 determines that a combination of the current drive voltage value and the rotational speed instruction value belongs to the first region R1. For example, in a case where the drive voltage value acquired by the voltage acquisition portion 311 is 24 V and the rotational speed instruction value set by the setting portion 313 is 60%, the calculation portion 314 determines that a combination of the current drive voltage value and the rotational speed instruction value belongs to the fifth region R5. For example, in a case where the drive voltage value acquired by the voltage acquisition portion 311 is 24 V and the rotational speed instruction value set by the setting portion 313 is 40%, the calculation portion 314 determines that a combination of the current drive voltage value and the rotational speed instruction value belongs to the sixth region R6.

As illustrated in FIG. 5, when confirmation of the attribute regions R1 to R6 is performed, the calculation portion 314 calculates the rotational speed threshold value using the reference value set according to the determined region (step S5). Therefore, it is possible to obtain the rotational speed threshold value suitable for the current drive voltage value and the rotational speed instruction value by a simple calculation formula. In addition, in the embodiment, in a case where the drive voltage values are the same, even if the rotational speed instruction value varies, the rotational speed threshold value is constant in a range in which the increase in the temperature of the motor 1 due to the variation in the rotational speed instruction value does not cause a problem. Therefore, the calculation in the calculation portion 314 can be reduced and a load applied to the CPU 31 can be reduced.

Three specific examples will be described.

In a case where the acquired drive voltage value is 27.2 V and the set rotational speed instruction value is 80%, as described above, the calculation portion 314 determines that the combination of the current drive voltage value and the rotational speed instruction value belongs to the first region R1. In this case, the calculation portion 314 calculates the rotational speed threshold value using the first reference value set RS1, the second reference value set RS2, and the third reference value set RS3. The rotational speed threshold value of a case where the drive voltage value is 27 V and the rotational speed instruction value 100% is calculated by performing a proportional calculation by using the first reference value set RS1 and the second reference value set RS2. Therefore, in a case where the drive voltage value is 27 V and the rotational speed instruction value is 100%, the rotational speed threshold value is obtained as X1=87,950 rpm. Moreover, X1 is obtained by solving the following equation (1).

$$(94,000-83,000)/(29.2-25.2)=(94,000-X1)/(29.2-27) \quad (1)$$

In addition, the rotational speed threshold value of a case where the drive voltage value is 25.2 V and the rotational speed instruction value 80% is calculated by performing a proportional calculation by using the second reference value set RS2 and the third reference value set RS3. Therefore, in a case where the drive voltage value is 25.2 V and the rotational speed instruction value is 80%, the rotational speed threshold value is obtained as Y1=73,000 rpm. In a case where a target drive voltage value is 27 V and the rotational speed instruction value is 80%, the rotational speed threshold value is obtained as 77,037 rpm by the proportional calculation using the rotational speed threshold value of the second reference value set RS2, X1, and Y1.

In a case where the acquired drive voltage value is 24 V and the set rotational speed instruction value is 60%, as described above, the calculation portion 314 determines that the combination of the current drive voltage value and the rotational speed instruction value belongs to the fifth region R5. In this case, the calculation portion 314 calculates the rotational speed threshold value using the second reference value set RS2, the third reference value set RS3, the fourth reference value set RS4, and the fifth reference value set RS5. The rotational speed threshold value of a case where the drive voltage value is 24 V and the rotational speed instruction value 100% is calculated by performing a proportional calculation by using the second reference value set RS2 and the fifth region R5. Therefore, in a case where the drive voltage value is 24 V and the rotational speed instruction value is 100%, the rotational speed threshold value is obtained as X2=79,571 rpm. In addition, the rotational speed threshold value of a case where the drive voltage value is 25.2 V and the rotational speed instruction value 60% is calculated by performing the proportional calculation by using the third reference value set RS3 and the fourth reference value set RS4. Therefore, in a case where the drive voltage value is 25.2 V and the rotational speed instruction value is 60%, the rotational speed threshold value is obtained as Y2=61,000 rpm. In a case where the target drive voltage value is 24 V and the rotational speed instruction value is 60%, the rotational speed threshold value is obtained as 58,480 rpm by the proportional calculation using the rotational speed threshold value of the second reference value set RS2, X2, and Y2.

In a case where the acquired drive voltage value is 24 V and the set rotational speed instruction value is 40%, as described above, the calculation portion 314 determines that the combination of the current drive voltage value and the rotational speed instruction value belongs to the sixth region R6. In this case, the calculation portion 314 calculates the rotational speed threshold value using the second reference value set RS2, the fourth reference value set RS4, and the fifth reference value set RS5. The rotational speed threshold value of a case where the drive voltage value is 24 V and the rotational speed instruction value 100% is calculated by performing a proportional calculation by using the second reference value set RS2 and the fifth region R5. This is the same as the case where the acquired drive voltage value is 24 V and the set rotational speed instruction value is 60%, and X2=79,571 rpm is obtained. In a case where the drive voltage value is 24 V and the rotational speed instruction value is 50%, the rotational speed threshold value is obtained as Y3=51,769 rpm by the proportional calculation using the rotational speed threshold value of the second reference value set RS2, the rotational speed threshold value of the fourth reference value set RS4, and X2. In the same drive voltage value, since the rotational speed threshold values are the same when the rotational speed instruction value is 50% or more, in a case where the target drive voltage value is 24 V and the rotational speed instruction value is 40%, the rotational speed threshold value is obtained as 51,769 rpm.

As illustrated in FIG. 5, if the rotational speed threshold value is calculated, the change portion 315 confirms whether or not the current rotational speed acquired by the rotational speed acquisition portion 312 is the rotational speed threshold value or less (step S6). The change portion 315 determines that the rotational speed of the brushless DC motor 1 is not abnormal and the change in the rotational speed instruction value is not performed in a case where the current rotational speed is the rotational speed threshold value. In a case where the current rotation speed is the rotational speed threshold value or less (Yes in step S6), the process returns to step S1 and the steps beginning with step S1 are repeated.

On the other hand, in a case where the current rotation speed exceeds the rotational speed threshold value (No in step S6), the change portion 315 changes the rotational speed instruction value. Specifically, the change portion 315 sets the rotational speed instruction value to 0% and performs a process of stopping the driving of the brushless DC motor 1 (step S7). As described above, the rotational speed instruction value after change may not be 0%.

Moreover, the change portion 315 may immediately change the rotational speed instruction value in a case where the current rotation speed exceeds the rotational speed threshold value. However, as another example, the change portion 315 may be configured to change the rotational speed instruction value in a case where the rotational speed acquired by the rotational speed acquisition portion 312 continues to exceed the rotational speed threshold value for a predetermined time. For example, in a case where the rotational speed is monitored every 1 millisecond and the rotational speed exceeds the rotational speed threshold value by 5 seconds or more, the rotational speed instruction value may be changed. Therefore, in a case where the rotational speed of the brushless DC motor 1 merely instantaneously exceeds the rotational speed threshold value, it is possible to continue the driving of the brushless DC motor 1 while maintaining the current rotation speed setting without changing the rotational speed instruction value.

In addition, in the embodiment, the change portion 315 changes the rotational speed instruction value regardless of the rotational speed threshold value in a case where the rotational speed acquired by the rotational speed acquisition portion 312 exceeds a predetermined rotational speed (No in step S2). Specifically, the change portion 315 performs a process of stopping the driving of the brushless DC motor 1 with the rotational speed instruction value being 0% (step S7). As described above, the rotational speed instruction value after change may not be 0%. Therefore, in a case where the rotational speed is abnormally high, the rotational speed instruction value can be forcibly changed and it is possible to prevent that a trouble occurs in the brushless DC motor 1.

This disclosure can be used, for example, for home appliances having the blowing device of the cleaner or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor control device of a brushless DC motor, the motor control device comprising:
   voltage acquisition circuitry that acquires a drive voltage of the motor;
   rotational speed acquisition circuitry that acquires a rotational speed of the motor;
   setting circuitry that sets a rotational speed instruction value of the motor according to an instruction input from outside;
   calculation circuitry that calculates a rotational speed threshold value of the motor according to the rotational speed instruction value;
   change circuitry that changes the rotational speed instruction value in a case where the rotational speed acquired by the rotational speed acquisition circuitry exceeds the rotational speed threshold value; and
   storage circuitry that stores reference data used to calculate the rotational speed threshold value; wherein
   the reference data includes at least three types of reference value sets each including a reference drive voltage value, a reference rotational speed instruction value, and a reference rotational speed threshold value; and
   the calculation circuitry performs a proportional calculation based on a current drive voltage value which is acquired by the voltage acquisition circuitry, a current rotational speed instruction value which is set by the setting circuitry, and the reference value set to calculate the rotational speed threshold value.

2. The motor control device according to claim 1, wherein the calculation circuitry determines that a combination of the current drive voltage value and the rotational speed instruction value belongs to a specific one of a plurality of regions previously divided based on a plurality of types of the reference value sets and calculates the rotational speed threshold value using the reference value set according to a determined region.

3. The motor control device according to claim 1, wherein the calculation circuitry sets the rotational speed threshold value to be the same as the rotational speed instruction value which is a first predetermined value or less in a case where the drive voltage values are the same.

4. The motor control device according to claim 1, wherein a number of the reference value sets is five or more.

5. The motor control device according to claim 1, wherein
   in a case where three reference values are set, in which the reference rotational speed instruction values are the same and the reference drive voltage values are different from each other, the three reference values are included in a plurality of the reference value sets; and
   with reference to the reference value set having an intermediate reference drive voltage value, a variation ratio of the reference rotational speed threshold value of a case where the reference drive voltage value varies in a direction to be increased is smaller than a variation ratio of the reference rotational speed threshold value in a case where the reference drive voltage value varies in a direction to be decreased.

6. The motor control device according to claim 1, wherein
   in a case where three reference value sets, in which the reference drive voltage values are the same and the reference rotational speed instruction values are different from each other, the three reference values are included in a plurality of reference value sets; and
   with reference to the reference value set having an intermediate reference rotational speed instruction value, a variation ratio of the reference rotational speed threshold value of a case where the reference rotational speed instruction value varies in a direction to be increased is smaller than a variation ratio of the reference rotational speed threshold value of a case where the reference rotational speed instruction value varies in a direction to be reduced.

7. The motor control device according to claim 1, wherein
   there are five of the reference value sets; and
   the five reference value sets include:
      three reference value sets in which the reference drive voltage values are the same and the reference rotational speed instruction values are different from each other; and
      three reference value sets in which the reference rotational speed instruction values are the same and the reference drive voltage values are different from each other.

8. The motor control device according to claim 7, wherein in the three reference value sets in which the reference drive voltage values are the same and the reference rotational speed instruction values are different from each other, the reference drive voltage value is a rated voltage of the motor.

9. The motor control device according to claim 7, wherein in the three reference value sets in which the reference rotational speed instruction values are the same and the reference drive voltage values are different from each other, the reference rotational speed instruction value is a maximum value capable of being set for the instructed value.

10. The motor control device according to claim 1, wherein the change circuitry changes the rotational speed instruction value in a case where a rotational speed acquired by the rotational speed acquisition circuitry continues for a predetermined time and exceeds the rotational speed threshold value.

11. The motor control device according to claim 1, wherein the change circuitry changes the rotational speed instruction value regardless of the rotational speed threshold value in a case where the rotational speed acquired by the rotational speed acquisition circuitry exceeds a predetermined rotational speed.

12. The motor control device according to claim 1, wherein the change circuitry rotates the motor with the rotational speed instruction value being a second predetermined value or less in a case where the rotational speed acquired by the rotational speed acquisition circuitry exceeds the rotational speed threshold value.

13. The motor control device according to claim 1, wherein the change circuitry performs a process of stopping driving of the motor in a case where the rotational speed acquired by the rotational speed acquisition circuitry exceeds the rotational speed threshold value.

14. A blowing device comprising:
the motor control device according to claim 1;
the brushless DC motor; and
an impeller that is attached to the brushless DC motor.

15. A cleaner comprising:
the blowing device according to claim 14.

* * * * *